36-7.3 AU 353 EX
FIP82C7 OR RE 13,928

1,095,834

C. L. K. FERGUSON.
FLEXIBLE DRESS OVERSHOE.
APPLICATION FILED JAN. 25, 1915.

Reissued June 15, 1915. 13,928.
2 SHEETS—SHEET 1.

Witnesses.—
Walter A. Pullinger
Willis A. Burrows

Inventor.—
Clara L. K. Ferguson.
by her Attorneys.—
Poulson & Poulson

THE NORRIS PETERS CO. PHOTO-LI 7. 3

C. L. K. FERGUSON.

FLEXIBLE DRESS OVERSHOE.

APPLICATION FILED JAN. 25, 1915.

Reissued June 15, 1915. 13,928.

2 SHEETS—SHEET 2.

Witnesses—
Walter F. Pallinger
Nills A. Burrows

Inventor—
Clara L. K. Ferguson,
by her Attorneys—
Howson & Howson

THE NORRIS PETERS CO., PHOTO-LITH 7.3

UNITED STATES PATENT OFFICE.

CLARA L. K. FERGUSON, OF PHILADELPHIA, PENNSYLVANIA.

FLEXIBLE DRESS-OVERSHOE.

13,928. Specification of Reissued Letters Patent. Reissued June 15, 1915.

Original No. 1,095,834, dated May 5, 1914, Serial No. 802,271. Application for reissue filed January 25, 1915. Serial No. 4,396.

*To all whom it may concern:*

Be it known that I, CLARA L. K. FERGUSON, a citizen of the United States, and a resident of Philadelphia, county of Philadelphia, State of Pennsylvania, have invented certain Improvements in Flexible Dress-Overshoes, of which the following is a specification.

One object of my invention is to design a dress shoe which can be worn over a dress slipper so as not only to hide the slipper, but also to protect it, as well as the stocking. The shoe is intended mainly as a clear weather shoe and not as a wet weather overshoe or arctic, although, incidentally, it can be worn in wet weather, as it is substantially water-proof.

A further object of the invention is to make the overshoe substantially similar in appearance to an ordinary dress shoe so that the feet of the wearer will be neat in appearance, the shoe corresponding with the other features of attire. Heretofore, it has been common practice to remove the slippers and to wear the usual street shoes, and, should the weather require it, arctics or carriage shoes, but as hereinabove stated, my invention can be substituted for these articles of foot gear.

Figure 1:
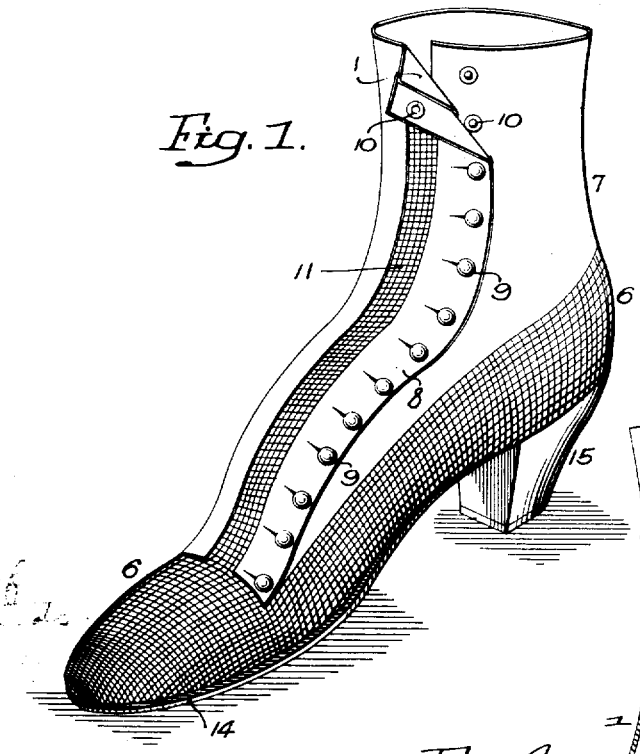
Figure 4:
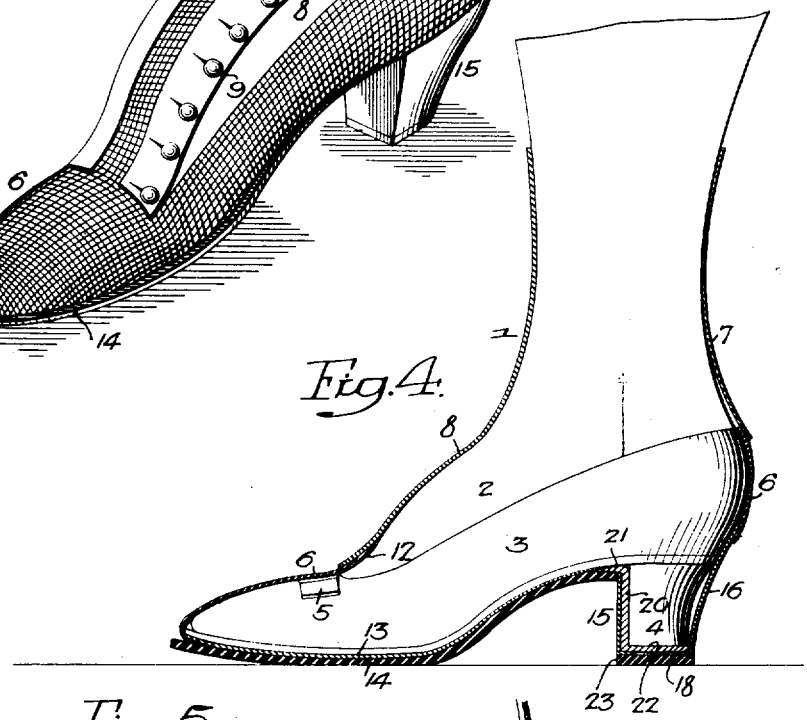
Figure 5:
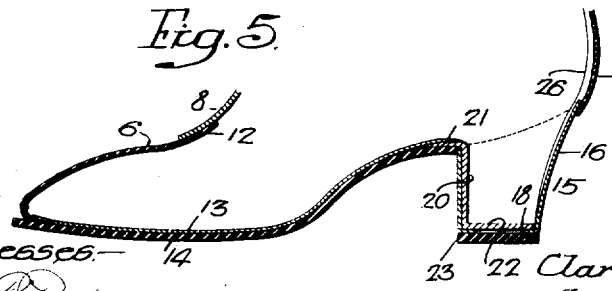
Figure 2:
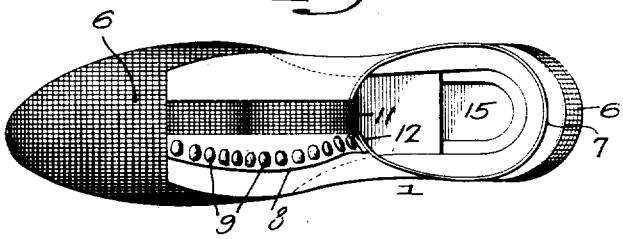
Figure 6:
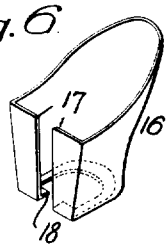
Figure 7:
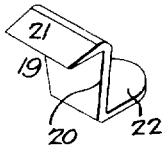
Figure 9:
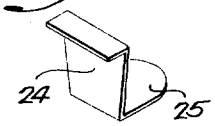
Figure 8:
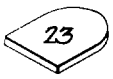
Figure 3:
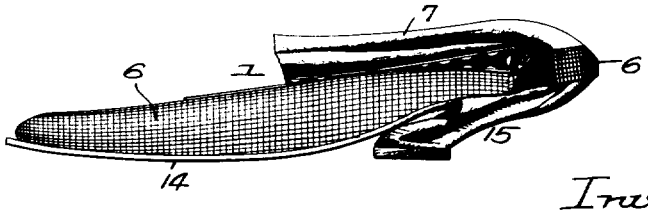

In the accompanying drawings: Figure 1 is a perspective view of my improved dress overshoe; Fig. 2 is a plan view of the shoe; Fig. 3 shows the shoe crushed or folded so that it can be placed in a pocket or bag; Fig. 4 is a sectional view of the dress overshoe, showing a slippered foot within it; Fig. 5 is a sectional view of the lower portion of my improved dress overshoe; Fig. 6 is a detached perspective view of the flexible heel; Fig. 7 is a view showing the inner lining of the front and base of the heel; Fig. 8 is a view of the rubber heel plate; and Fig. 9 is a view of the cover piece which may be used to hide the seam at the front of the heel.

Referring to the drawings, 1 is the overshoe which snugly fits over the foot 2 of the wearer which is in a slipper 3 having the ordinary high heel 4. 5 is the bow or buckle of the slipper. The overshoe 1 has a vamp 6 which extends completely around the front portion of the shoe and a counter at the rear, said vamp and counter being made of yielding cloth woven with rubber strands therein in such a manner as to yield freely to accommodate the inequalities of the slipper 3 and to fit snugly to the slipper and foot, giving a neat appearance. The upper 7 is preferably made with an open flap 8 extending almost to the toe of the overshoe, there being a series of false buttons 9, in the present instance. This flap is fastened to the body of the upper by spring clips 10, of any form desired, one part of the clip being on the flap and the other on the upper, as shown in Fig. 1, but other means of fastening may be used without departing from the main features of the invention.

The fabric I prefer to use for the vamp and counter is made of a series of rubber strands, each strand being wrapped. These strands may either form the warp or the weft of the fabric and are held together by threads interwoven therewith. This makes a fabric which will yield to conform to the contour of the slipper and foot and will not be affected to any extent by the heat of the foot. It is also water-proof to a certain degree. The fabric is so cut and applied to the shoe that the elastic strands extend transversely from one side to the other at the toe and vertically around the heel. Thus, the vamp can be stretched to allow for the overlapping portions of the dress slipper and the buckle.

The upper has an insert 11 of yielding cloth with rubber strands arranged transversely therein, which allows that portion of the rubber to stretch so that it will conform to the shape of the foot of the wearer.

12 is a portion of the vamp which extends under the flap 8 of the upper so as to make that portion of the shoe substantially water-proof.

13 is the insole and 14 is the outer sole, which is preferably made of rubber. This outer sole terminates at the heel 15 and the insole also terminates at the heel. The heel 15 consists of a body portion 16 of flexible leather, which is shaped as shown in Fig. 6, and the edges 17 of the heel are connected together by stitching or cement, as desired. The lower end of this body of the heel is turned under, as at 18, to form a flange.

19 is a piece of leather shaped to form a comparatively stiff front piece 20 for the heel and has an extension 21 which underlaps the insole 13, and has a portion 22 forming the inner base of the heel.

23 is a rubber heel section which is secured to the outer surface of the heel so that the flexible body portion 16 is held between the inner base 22 and the rubber heel section 23.

If desired, in some instances, a cover strip 24 may be used, which has an extension 25 projecting between the body 16 of the heel and the rubber heel piece 23 and may be stitched to the end of the sole, but where there is a close fit of the edges of the body portion of the heel, this strip may be omitted.

I preferably line the shoe with an elastic fabric 26, Fig. 5, which is so woven as to readily yield or stretch with the body of the shoe.

An overshoe made in accordance with my invention has sufficient flexibility to permit of its being folded into a small compass, as illustrated in Fig. 3. The heel is flexible and the sole, being of rubber, will yield and can be folded, if desired. The lining of the vamp and upper is preferably made in one piece and this lining extends down to the bottom of the heel. The lining is made of an elastic fabric so that it will yield with the elastic fabric of the vamp.

It will be seen that when the overshoe is drawn over a dress slipper it will yield to accommodate itself to the slipper and it will snugly fit the slipper, as well as the stocking of the wearer, so that it has the appearance of the ordinary walking shoe, and while it is not necessarily a shoe to be worn in wet weather, it can be worn then with comfort, as it is substantially water-proof. The ordinary low cut rubber overshoe can be worn, if desired, over this dress overshoe without inconvenience to the wearer.

By making the vamp and counter of yielding woven cloth inclosing rubber strands, these parts can be made of any color desired to harmonize with the dress to be worn therewith, or the shoe may be finished in black or in white to harmonize with all shades.

The main feature of the invention is to make the dress overshoe so that it will have the appearance of a complete dress shoe. It can be worn without detracting in any way from the appearance of the wearer, as it is a combination of elegance and utility. Overshoes ordinarily worn are clumsy affairs and are exceedingly awkward to walk in as they enlarge the contour of the feet, which renders them undesirable from an esthetic standpoint.

I claim:

1. The combination in a dress overshoe, of a sole; an insole; an elastic vamp and counter; an upper; an elastic heel comprising a body of yielding material having a turned in portion; a leather strip forming a portion of the front of the heel and extending between the sole and the insole and also extending over the turned in portion of the flexible body of the heel; and an outside heel piece, the several sections being secured together to form an extended flexible heel.

2. A dress overshoe having a rubber sole extending to the heel; an insole also extending to the heel; a flexible piece forming the body of the heel and having an inturned edge; a leather piece forming a part of the front of the heel and having a lip extending between the rubber sole and the insole and having an extension forming the inner base of the heel; a rubber base piece forming the bottom of the heel, the inner base and rubber base being secured together with the inturned edge of the body portion between them; a flexible vamp and counter; and an upper secured to the counter and having a yielding section at the front.

3. The combination in a dress overshoe, of a heavy sole of rubber; an insole; a collapsible heel; a yielding vamp and counter formed of fabric with rubber inclosed therein; an upper having a flap; means for securing the flap to the body of the upper, said flap extending directly above the bow or buckle of a slipper located within the shoe; and an uninterrupted lining of elastic fabric extending from the bottom of the heel to the top of the upper.

4. A flexible dress overshoe consisting of a rubber outer sole; an insole; an upper; a section forming the vamp and counter made of fabric with strands of rubber woven therein; a flexible heel having a body portion formed of a single piece of material united at the front and having an inturned lower flange; a leather section forming the stiffening for the front of the heel having a beveled section extending between the soles; a base section extending over the inturned flange of the body portion of the heel; a rubber heel piece secured to the outside of the heel; and a cover strip extending over the front of the heel and having a portion projecting between the rubber heel piece and the inturned flange of the body portion of the heel.

5. The combination in a dress overshoe, of a sole; a heel; a yielding upper and a yielding fabric section extending from the upper to the sole and extending around the shoe and including the vamp and the counter so that the shoe can be worn over a slipper, the yielding portions accommodating themselves to and snugly fitting the slipper, the heel receiving the high heel of the slipper.

6. The combination in a dress overshoe, of a sole; a heel; an upper having a flap; means for fastening the flap to the body of the upper, said flap having an elastic section extending the full length of the upper; and a yielding fabric section having rubber inclosed therein and extending entirely around 7.3 the shoe between the upper and the sole and heel and forming the vamp and counter of the shoe so that, when the shoe is worn over a slipper, it will snugly fit and will accommodate itself thereto, having all the appearance of an ordinary dress shoe.

7. The combination in a dress overshoe, of a heavy sole of rubber; an insole; a heel; a yielding vamp and counter formed of fabric with rubber inclosed therein; an upper having a flap; means for securing the flap to the body of the upper, said flap extending directly above the bow or buckle of a slipper located within the shoe; and an uninterrupted lining of elastic fabric extending from the bottom of the heel to the top of the upper.

8. The combination in a dress overshoe, of a flexible sole; an upper and a combined vamp and counter made of an elastic fabric consisting of a series of strands of rubber covered and woven with a series of threads, the strands of rubber extending transversely at the vamp and vertically at the heel so as to allow the body portion of the shoe to accommodate itself to the slipper and foot of the wearer; and a hollow heel arranged to receive the heel of a dress slipper.

In testimony whereof, I have signed my name to this specification, in the presence of two subscribing witnesses.

CLARA L. K. FERGUSON.

Witnesses:
CLYDE T. MOYER,
WM. A. BARR.

Copies of this patent may be obtained for five cents each, by addressing the "Commissioner of Patents, Washington, D. C."